United States Patent
Persson et al.

(10) Patent No.: US 11,009,841 B2
(45) Date of Patent: May 18, 2021

(54) INITIALISING CONTROL DATA FOR A DEVICE

(71) Applicant: ARM LIMITED, Cambridge (GB)

(72) Inventors: Håkan Persson, Skåne (SE); Matthew Lucien Evans, Cambridge (GB)

(73) Assignee: ARM Limited, Cambridge (GB)

( * ) Notice: Subject to any disclaimer, the term of this patent is extended or adjusted under 35 U.S.C. 154(b) by 185 days.

(21) Appl. No.: 15/019,097

(22) Filed: Feb. 9, 2016

(65) Prior Publication Data
US 2016/0259310 A1    Sep. 8, 2016

(30) Foreign Application Priority Data
Mar. 2, 2015   (GB) .................................... 1503508.2

(51) Int. Cl.
*G05B 19/042* (2006.01)

(52) U.S. Cl.
CPC .. *G05B 19/042* (2013.01); *G05B 2219/23425* (2013.01); *G05B 2219/25365* (2013.01)

(58) Field of Classification Search
CPC ........ G05B 19/042; G05B 2219/23425; G05B 2219/25365; G06F 9/4401; G06F 9/4406
USPC ......................................................... 700/11
See application file for complete search history.

(56) References Cited

U.S. PATENT DOCUMENTS

| | | | | |
|---|---|---|---|---|
| 5,586,290 A * | 12/1996 | Hirai | ................... | G06F 12/0866 710/15 |
| 7,607,000 B1 | 10/2009 | Smith et al. | | |
| 9,128,625 B1 * | 9/2015 | Ananthabhotla | ..... | G06F 3/0632 |
| 2001/0011326 A1 * | 8/2001 | Yoshikawa | ............. | G06F 12/08 711/119 |
| 2007/0101114 A1 * | 5/2007 | Inoue | ....................... | G06F 21/88 713/1 |
| 2011/0296133 A1 * | 12/2011 | Flynn | .................. | G06F 11/1048 711/171 |
| 2012/0084528 A1 * | 4/2012 | Hu | .......................... | G06F 12/08 711/165 |
| 2014/0281333 A1 * | 9/2014 | Peterson | ............. | G06F 12/1009 711/170 |

FOREIGN PATENT DOCUMENTS

JP      2012-099015      5/2012

OTHER PUBLICATIONS

English translation of Japanese Patent document 2012-099015 from j-platpat, 13 pages, May 24, 2012. (Year: 2012).*

(Continued)

*Primary Examiner* — Robert E Fennema
*Assistant Examiner* — Christopher W Carter
(74) *Attorney, Agent, or Firm* — Nixon & Vanderhye, P.C.

(57) ABSTRACT

A method for initialising control data for a device comprises determining whether an identification value stored in a control storage location of the device has a first value or second value. When the identification value has the first value, space is allocated in the memory for storing the control data and an address of the allocated space in memory is written to a control data pointer storage location of the device. When the identification value has the second value, the allocation of space in memory is omitted and the control data pointer storage location comprises a preset address indicative of a location for storing the control data in local storage provided within the device.

17 Claims, 5 Drawing Sheets

(56) References Cited

OTHER PUBLICATIONS

Yokohama Samsung, Nonvolatile Semiconductor Memory Device, May 24, 2012, Espacenet English Translation of Japanese Patent Application 2012099015 (Year: 2012).*
Search Report for GB1503508.2 dated Sep. 1, 2015, three pages.

* cited by examiner

INITIALISING CONTROL DATA FOR A DEVICE

This application claims priority to GB Patent Application No. 1503508.2 filed 2 Mar. 2015, the entire content of which is hereby incorporated by reference.

BACKGROUND

1. Technical Field

The present technique relates to the field of data processing. More particularly, it relates to the handling of control data for a device.

2. Technical Background

A data processing system may include a device which performs processing activities based on control data.

SUMMARY

In some examples, the present technique provides a method for initialising control data for a device, the method comprising:

determining whether an identification value stored in a control storage location of the device has a first value or a second value;

when the identification value has the first value, allocating space in memory for storing the control data and writing an address of the allocated space in memory to a control data pointer storage location of the device; and when the identification value has the second value, omitting allocating the space in memory for storing the control data, wherein when the identification value has the second value, the control data pointer storage location comprises a preset address indicative of a location for storing the control data in local storage provided within the device.

In some examples, the present technique provides a storage medium storing a program for controlling a processing device to perform the method discussed above. The storage medium may be a non-transitory storage medium. The processing device which executes the program may be the device using the control data itself or could be a different device.

In some examples, the present technique provides a processing device configured to perform the method discussed above.

In some examples, the present technique provides a processing device comprising:

storage circuitry configured to store data;

a control storage location configured to store an identification value having one of a first value and a second value; and control circuitry configured to determine, on initialisation of the data processing device, whether the identification value has the first value or the second value;

wherein when the identification value has the first value, the control circuitry is configured to allocate space in memory for storing control data and to write an address of the allocated space in memory to a control data pointer storage location; and when the identification value has the second value, the control circuitry is configured to omit allocating the space in memory for storing the control data, and the control data pointer storage location comprises a preset address indicative of a location for storing the control data in the storage circuitry.

In some examples, the present technique provides a processing device comprising:

means for storing data;

means for storing an identification value having one of a first value and a second value; and control means for determining, on initialisation of the data processing device, whether the identification value has the first value or the second value;

wherein when the identification value has the first value, the control means is configured to allocate space in memory for storing control data and write an address of the allocated space in memory to a control data pointer storage location; and when the identification value has the second value, the control means is configured to omit allocating the space in memory for storing the control data, and the control data pointer storage location comprises a preset address indicative of a location for storing the control data in said means for storing data.

The above, and other objects, features and advantages will be apparent from the following detailed description of illustrative embodiments which is to be read in connection with the accompanying drawings.

DESCRIPTION OF EXAMPLES

A data processing system may have various devices which perform processing activities based on control data. For example a memory management unit (MMU) which is responsible for address translation may rely on control data such as pointers to page tables for defining address translation mappings and access permissions, a peripheral controller may control interaction with a peripheral device based on control data, or a direct memory access (DMA) controller may control DMA operations based on control data. The control data may be provided in the form of a table or linked list within memory. It can be relatively slow to access the control data from the memory.

It can be useful to have a consistent programming interface for a particular type of device in a data processing system. However, the same device may be used in different situations where it has different requirements. For example, in some cases, the device may require a larger amount of control data than others. If the amount of control data required is limited, then it may be more efficient to hold the control data within local storage provided within the device, such as registers or a local cache. On the other hand, if the amount of control data is large, then holding this within local storage can incur a considerable area cost, and it can be more efficient to store the control data in memory. For software using the device, it is preferable that when accessing the control data it is not necessary to consider which approach has been used for storing the control data.

An identification value is provided in a control storage location of the device. It is determined whether the identification value has a first value or a second value. When the identification value has a first value, then space is allocated in memory for storing the control data and an address of the allocated space in memory is written to a control data pointer storage location of the device. On the other hand, when the identification value has the second value, then the allocation of space in memory can be omitted and instead the control data pointer storage location comprises a preset address indicating a location for storing the control data in local storage provided within the device. In this way, regardless of whether the control data is stored in memory or the local storage, subsequent accesses to the control data can be made using the control data pointer storage location in a way which is transparent to any software using the control data. This allows either mechanism to be used for storing the control data, for example with the local storage being selected if there is relatively little control data and the memory being selected if there is a greater amount of control data. The identification value selecting which approach is used may be set during manufacture of an apparatus comprising the device, e.g. by providing a read only register which cannot changed following implementation.

In some examples, the preset address in the control data pointer storage location when the identification value has a second value may be a fixed address. For example, the control data pointer storage location may be hard wired to be read only. Alternatively, the preset address may be set up during initialisation of the device. For example, the device may have some presetting circuitry which presets the address in the control data pointer storage location when the identification value has the second value. For example, this may take place during power up of the device. Either way, when the identification value has the second value, then the address in the control data pointer storage location is already set up from the point of view of software and software running on the device does not need to initialise it. In contrast, when the identification value has the first value, then the software may be responsible for allocating space in memory for the control data and writing an address of the allocated space to the control data pointer storage location.

The address in the control data pointer storage location may be an absolute address which identifies the actual location of the control data, or could be a relative address which identifies an offset of the control data compared to a base address. A control value in the control storage location may indicate whether the address is absolute or relative.

In some examples, subsequent accesses to the control data may be made using the control data pointer storage location. However, if the address in the control data pointer storage location is a relative address then further calculation of the absolute address of the control data may be required, using a base address for example. To avoid recalculating the actual address on each access to the control data, an internal pointer may also be set based on the address in the control data pointer storage location and any subsequent accesses to the control data may be controlled using the internal pointer. For example, the internal pointer may be stored in another register or within a cache or memory in the device. Hence, when the identification value has the first value, then the internal pointer may be set based on the address of the allocated space in memory while if the identification value has a second value then the internal pointer may be set based on the preset address in the control data pointer storage location. Either way, on subsequent accesses to the control data, the control software need not be aware of whether the control data is stored in the memory or the local storage, and can access the control data with reference to the internal pointer. Therefore, after initialisation of the control data, the location of the control data is transparent to software.

Once the address in the control data pointer storage location has been established based on the identification value, the initialisation method may also include writing control data in the local storage or the memory as appropriate.

The local storage may comprise one or more registers of the device or could be an on-chip local memory (e.g. built into the device). Where the local storage comprises registers, the preset address within the control data pointer register may be an address of a memory mapped register or an offset relative to a base address of a memory mapped register.

The device for which the control data is provided may be any device within a data processing system for which control data may be stored to memory. For example, the device could be a DMA controller or peripheral controller as discussed above.

However, the present technique is particularly useful where the device comprises a memory management unit (MMU) for managing access to memory by at least one device. For example, the MMU may be responsible for address translation and the control data may identify page tables or address translation modes to use for the translation.

The technique discussed above is particularly useful if the control data comprises a number of control data entries which correspond to different contexts or devices for which access to memory is controlled by the MMU. For example, each device or each context within the same device may require different page tables and so different control data entries may be provided for each device or context to identify the page table to use for that device or context. In some cases, a MMU may need to support a limited number of contexts or devices, while in other cases there may be a larger number. If the number of contexts or devices is limited, then it is more efficient in terms of performance to use registers or other local storage to directly hold the configuration data for the different contexts or devices, while if the number of contexts is large, then it can save considerable area if the control data for each context or device is stored in memory and accessed through a bus interface for example. By supporting both approaches in a way that is transparent to any software driver executing using the MMU, the initialisation method discussed above can greatly simplify the software driver design while allowing each particular implementation to select the approach that is most suitable for its needs.

In some cases the device may have a number of different types of control data. For example in the context of an MMU, the different types of control data may include at least two of address translation control data for controlling address translation performed by the MMU (such as page table data or pointers, access permissions or address translation mode data), a command queue for tracking commands received by the MMU (e.g. read commands, write commands or address translation commands) and an event queue for tracking events detected by the MMU and reporting of such events to the devices (e.g. the events may include page faults, access permission violations etc.).

If there are several types of control data, then it is not essential to store all of the control data in memory or to store all of the control data in the local storage. It is possible to store some types in memory and other types in the local storage. Hence, the control storage location may store identification values for at least two different types of control data and at initialisation it may be determined for each of the at least two types of control data whether the corresponding identification value has the first value or the second value. For any type of control data for which the corresponding identification value has the first value, space may be allocated in memory for that control data and an address of the allocated space may be written to a control data pointer storage location. For any type of control data for which the corresponding identification value has a second value, the allocation of space in memory can be omitted and it can be assumed that the control data pointer storage location for that type of control data is already preset with the address of a location in the local storage for storing the control data. This allows the most appropriate approach to be selected for each different type of control data. In some cases, there may be two or more types of control data which share a corresponding identification value. For example, a single identification value may set whether both the command queue and event queue mentioned above are to be stored in memory or in the local storage.

Even when the control data is stored in memory when the identification value has a first value, some of the control data may be cached locally within the device to improve performance.

Figure 1:
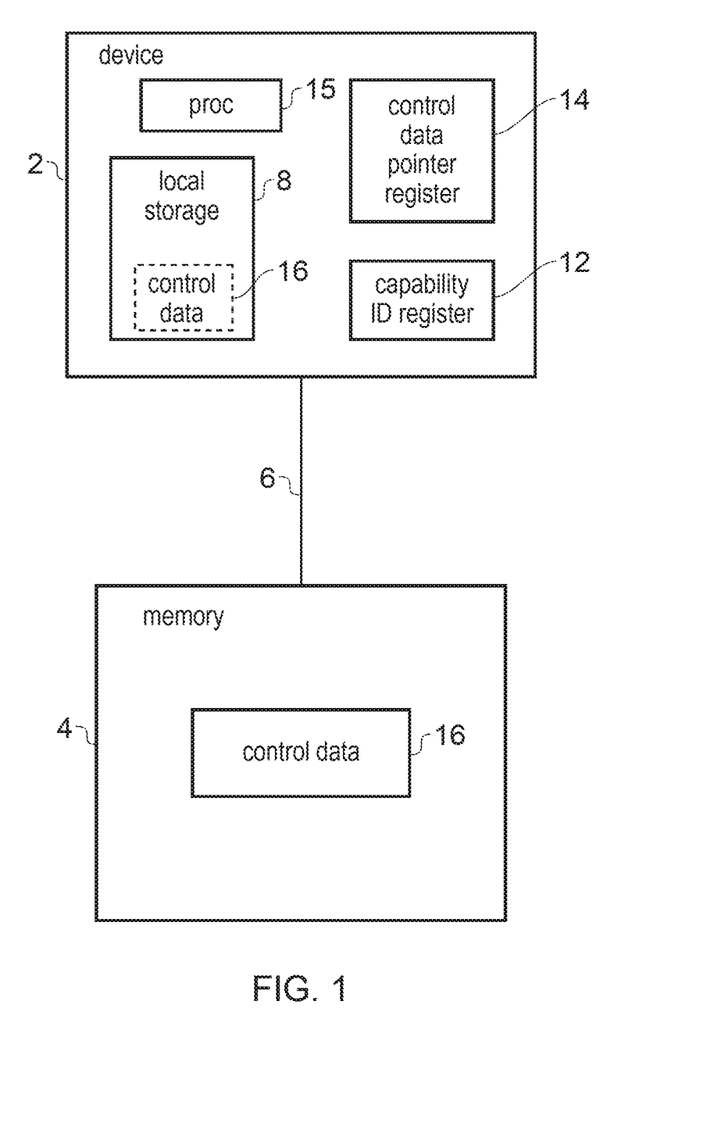
FIG. 1 schematically illustrates an example of a device having associated control data stored in memory.

FIG. 1 schematically illustrates an example of a device 2 within a data processing system which operates using control data. For example, the device may be an MMU as discussed later or could be a DMA controller, USB controller, other peripheral controller or any other device which has a control data structure which may be saved to memory. The device is able to access memory 4 via a bus interface or interconnect 6. The memory 4 may include one or more caches. The device 2 has some local storage 8 which may be a set of registers or a local cache memory. Control data 16 for controlling the device 2 may be stored in memory 4 or in the local storage 8. The device 2 has one or more capability identification registers 12 which can be inspected by a driver or other process using the device to determine specific details about the device such as where its control data 10 is stored. Also the device has one or more control data pointer registers 14 which can point to the address where the device control data 16 is stored. The control data 16 can take various forms, such as descriptors, message queues, etc. The device may also have processing circuitry 15 for carrying out processing operations, including the initialisation of the control data 16.

The capability identification registers 12 are used to indicate particular properties for the control data pointer registers 14. There may be multiple control data pointer registers provided for different types of control data and in this case each type of control data may have a different identification value in the capability identification registers 12. Alternatively, multiple types of control data may share a common identification value.

The identification value may in some cases indicate that the control data pointer register 14 for a particular type of control data is preset, which means that it is read only and assumed to be already initialised by the device 2 when powered on. From software's perspective the data pointer in the control data pointer register 14 is already set up and indicates an existing structure to use within the local storage 8 for storing the control data 16. On the other hand, if the capability identification register 12 indicates that for a particular type of control data the control data pointer register 14 is not preset, then this means the control data 16 is to be stored in memory 4, and during initialisation of the device 2 a software driver may allocate space in memory 4 for the control data 16 and write the address of the allocated memory region into the control data pointer register 14. Either way, subsequent accesses can then be performed using the address in the control data pointer register in a way that is transparent to the software driver.

Figure 2:
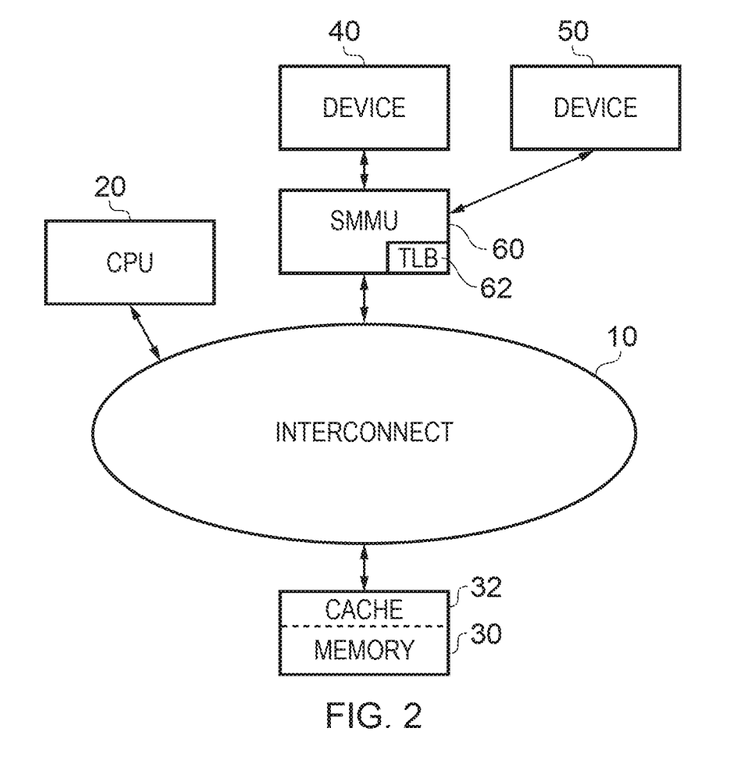
FIG. 2 schematically illustrates an example of a system comprising a memory management unit.
Figure 3:
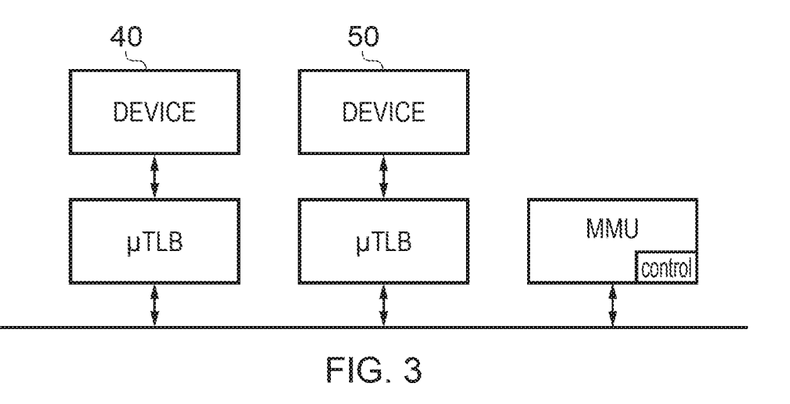
FIG. 3 shows an example where the memory management unit is distributed.

FIGS. 2 and 3 show a more specific example where the device 2 comprises a memory management unit (MMU) 60. FIG. 2 is a schematic diagram of a data processing arrangement in a virtualized environment. In FIG. 2, various units are connected via an interconnect arrangement 10. The units connected via the interconnect arrangement 10 include: a central processing unit (CPU) 20, a system memory 30 optionally including cache memory 32, one or more devices 40, 50 and a system memory management unit (SMMU) 60 including a translation lookaside buffer (TLB) 62. While the description below refers to accesses to "memory", it will be appreciated that this may also include accesses to the cache 32.

The SMMU is a type of MMU which is responsible for managing access to memory for a number of devices 40, 50, which may often be peripheral devices managed by the host CPU 20. The devices may include, for example, a peripheral user interface or data input/output devices such as a camera device.

Each of the devices 40, 50 is associated with a virtual machine (VM) or guest system in a virtual environment. The apparatus of FIG. 2 provides the devices with access to a virtual address space defined by virtual memory addresses. Each virtual machine sees its own virtual address space which contains instructions and data for use by that virtual machine. Amongst other advantages, the use of virtual addressing allows a host operating system or hypervisor (HV) to control memory access by inhibiting one virtual machine from accessing or corrupting information used by another virtual machine. FIG. 2 provides an example of such an arrangement in which a host data processing system which provides a virtual operating environment for one or more guest data processing systems.

The system memory is addressed by physical addresses. Therefore when a device requests access to a virtual memory address, for example to read or to write either an instruction or a data item, the virtual memory address is translated into a physical memory address so that the required information can be obtained from or written to the system memory 30. The translation of memory addresses is carried out by the SMMU 60.

The TLB 62 provides a caching function in the memory address translation process. The TLB 62 stores recently or commonly used translations between virtual and physical memory addresses. So, as a first step in an address translation process, the TLB 62 is consulted in order to detect whether the TLB already contains the required address translation. If not, then a more involved translation process may be used, for example involving consulting so-called page tables holding address translation information, typically resulting in the TLB 62 then being populated with details of the required translation.

The virtualized system of FIG. 2 makes use of multiple stage address translation. In this arrangement, two levels of translation are used. A virtual address (VA) required by an executing program or other system module in one of the devices 40 is translated to an intermediate physical address (IPA) by a first MMU stage. As far as the VM software is aware, the IPA is a physical address used to access the system memory. However, the virtualized system provides a second level of address translation such that the IPA is then translated to a physical address (PA) by a second MMU stage. The IPA to PA translation is wholly under the control of the hypervisor. So, a particular VM may be exposed to the VA to IPA translation, whereas the hypervisor has oversight of the IPA to PA translations and therefore control of real accesses to the physical system memory.

In some examples, each device 40, 50 may be associated with a respective virtual machine. In other examples, multiple devices may be associated with a single virtual machine. In terms of communication between the devices and the SMMU 60, the devices may each be associated with a respective "stream" identifier (stream ID) which, among other functions, can assist with routing SMMU transactions to and from the devices.

FIG. 2 shows the use of one SMMU 60. In other examples, such as that shown in FIG. 3, the memory management unit functionality may be, in part, distributed in that TLBs may be respectively associated with each device, so that translation takes place locally to the device but, in the case of required translation not being found in the respective TLB (a TLB "miss") reference is made to a central MMU for resolution of the required translation. However, for the purposes of the discussion which follows, either arrangement is applicable.

Note also that FIGS. 2 and 3 are schematic illustrations of the physical structure of the data processing arrangement. The logical structure provides one or more VMs and a HV. The VMs and the HV exist as different software processes running on the CPU 20, for example with different respective levels of operating privilege. So, a common CPU, running different respective software (which may be stored in the system memory 30), can provide the functionality of the VM(s) and the HV.

Figure 4:
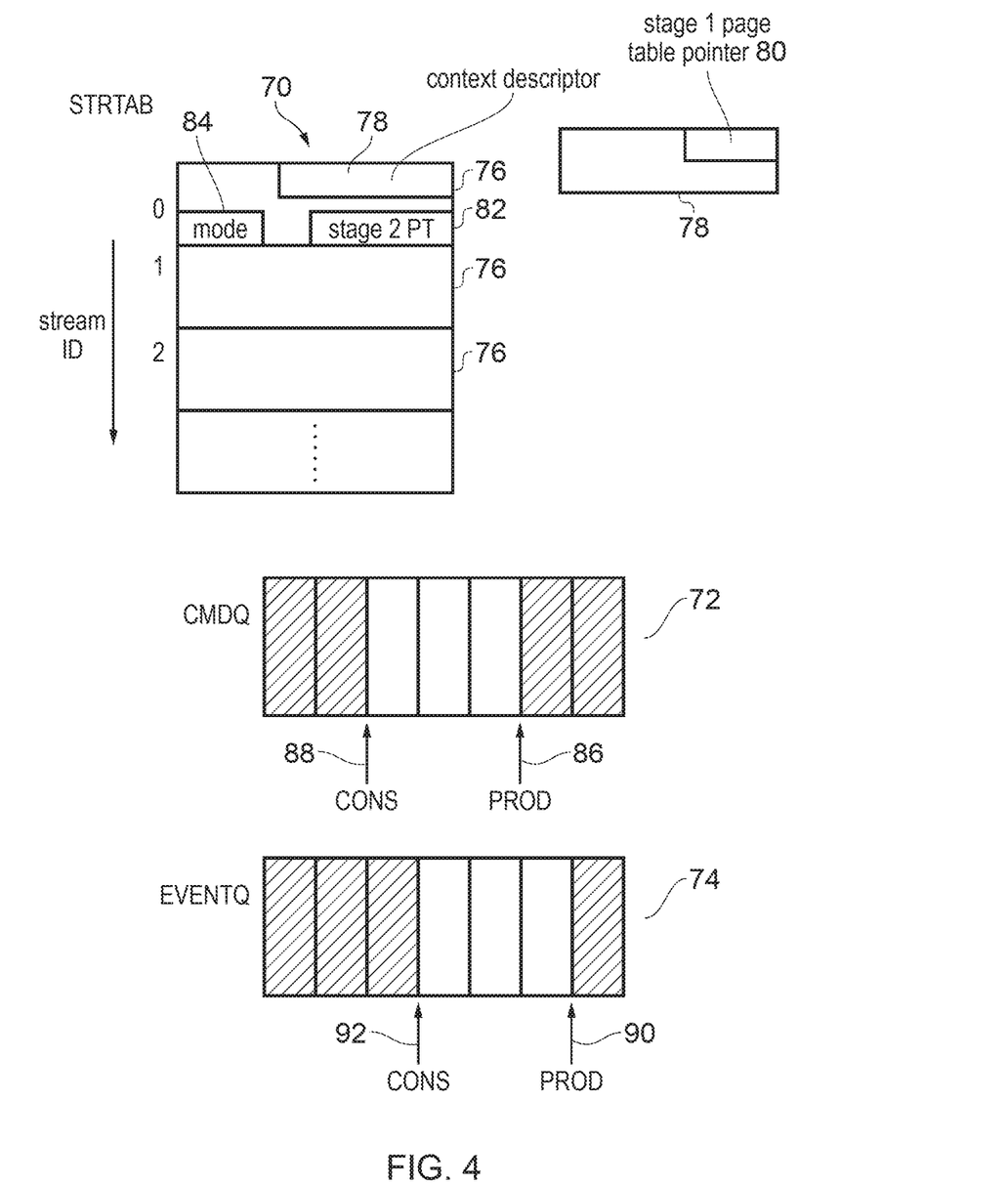
FIG. 4 illustrates an example of control data for the memory management unit.

FIG. 4 shows an example of the control data which may be used by the MMU 60 shown in FIGS. 2 and 3. The control data may include a stream table 70, a command queue 72 and an event queue 74. The stream table 70 includes a number of stream table entries 76 each corresponding to a different stream of transactions received by the MMU 60. Each stream may have a corresponding stream identifier and corresponds to the transactions issued by a particular device 40, 50, or the transactions issued within a particular context associated with one of the devices 40, 50. Some devices may be able to issue translations associated with multiple contexts and so in this case these may have different stream IDs. Each stream table entry 76 includes several pieces of control information for handling address translations for memory accesses having the associated stream ID. For example the stream table entry may include a context descriptor 78 which provides information specific to the context in which the accesses are made. For example the context descriptor as shown in FIG. 4 may include a pointer 80 to stage 1 page tables to be used for a stage 1 address translation (VA to IPA). The stream table entry may also include a second page table pointer 82 indicating the location of stage 2 page tables to be used for a stage 2 address translation (IPA to PA). The stream table entry may also include data such as a mode flag 84 indicating which of several address translation modes to use for the transactions associated with that stream ID. It will be appreciated that many other types of data could be included in the stream table.

The command queue 72 is used to queue memory accesses and other address translation commands received by the MMU. The command queue 72 functions as a circular buffer into which outstanding commands are stored. A producer pointer 86 points to the location within the buffer at which the next command should be stored when it is received and a consumer pointer 88 points to the location of the next command to be processed. Each time another command is added the producer pointer 86 is incremented and similarly each time a command is processed, then the consumer pointer 88 is incremented. When either pointer 86, 88 reaches the end of the buffer, then at the following increment it jumps back to the start of the buffer. Similarly, the event queue 74 comprises a circular buffer for holding event commands which are generated by the SMMU 60 when certain events are detected such as page faults or access violations. Again there may be an event queue producer pointer 90 and an event queue consumer pointer 92 which chase each other around the circular buffer in a similar way to the command queue. In response to the event queue commands the SMMU 60 may issue signals to other devices to inform them that the events have occurred.

Different embodiments may need different amounts of control data. In some cases there may be a very large number of contexts or devices for which transactions can be detected and so this may require a relatively large stream table 70 while other examples may have fewer contexts or devices. Similarly, some SMMUs may require larger or smaller command queue or event queue buffers 72, 74. Depending on the amount of control data it may sometimes be more efficient to store this in the local storage 8 within the SMMU and other times it may be more efficient to push this out to memory 4.

Figure 5:
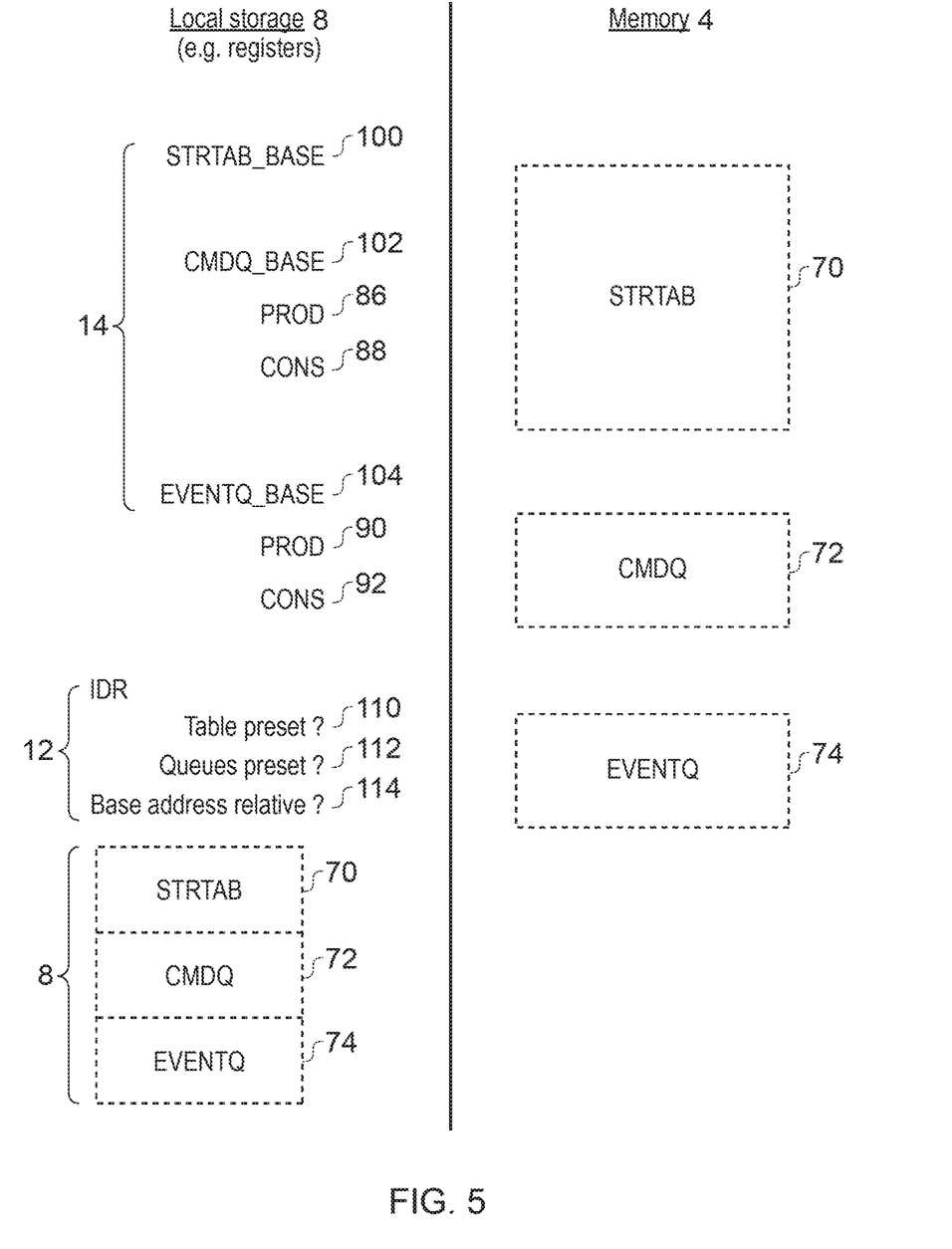
FIG. 5 shows an example of how the control data can be stored either within memory or within a local storage.

FIG. 5 shows an example of how this can be controlled. As shown in FIG. 1 the SMMU 60 may have a capability identification register 12 and various control data pointer registers 14. As shown in FIG. 5 there may be several control data pointer registers provided for each of the types of control data (stream table 70, command queue 72 and event queue 74). For each type of control data there is provided a base address 100, 102, 104 pointing to the location of the control data. For the queues 72, 74, the control data pointer register 40 may also include the producer and consumer pointers 86, 88, 90, 92 as discussed above. In some cases the producer and consumer pointers may be indicated relative to the queue base address 102, 104.

As shown in FIG. 5 the capability identification register 12 may include information for initialising or interpreting the control data pointer registers. The capability identification register 12 may include a stream table identification parameter 110 indicating whether the base address 100 for the stream table is preset or not, a queue identification parameter 112 indicating whether the base addresses 102, 104 for the command and event queues are preset, and an address type parameter 114 indicating whether the base addresses 100, 102, 104 indicated in the control data pointer registers 14 are relative or absolute.

If the base address 100 for the stream table is indicated by the stream table identification parameter 110 to be preset, then this means that the base address register 100 includes a fixed value which points to a location in the local storage 8 for storing the stream table 70. Similarly, if the queue identification parameter 112 indicates that the queues are preset then the base addresses 102, 104 will point to locations within the local storage 8 for storing the queues 72, 74 (see the dotted lines in the bottom left part of FIG. 5). On the other hand, if the stream table 70 or queues 72, 74 are not preset, then during initialisation of the device, a software driver will allocate space in memory as shown in the dotted lines in the right hand part of FIG. 5 for storing the stream table 70 and queues 72, 74. The driver will then also write the base address of the allocated regions to the respective base address registers 100, 102, 104. It is possible for the table 70 to be preset but not the queues 72, 74, or vice versa, so that some of the control data may be in memory and others may be in the local storage. This allows the system designer to configure the control data storage depending on the needs of the particular system being implemented.

If the base addresses are indicated as relative addresses by the address type parameter 114, then the value in the base address registers pointing to the local storage may be an offset relative to a base address indicated somewhere else.

Figure 6:
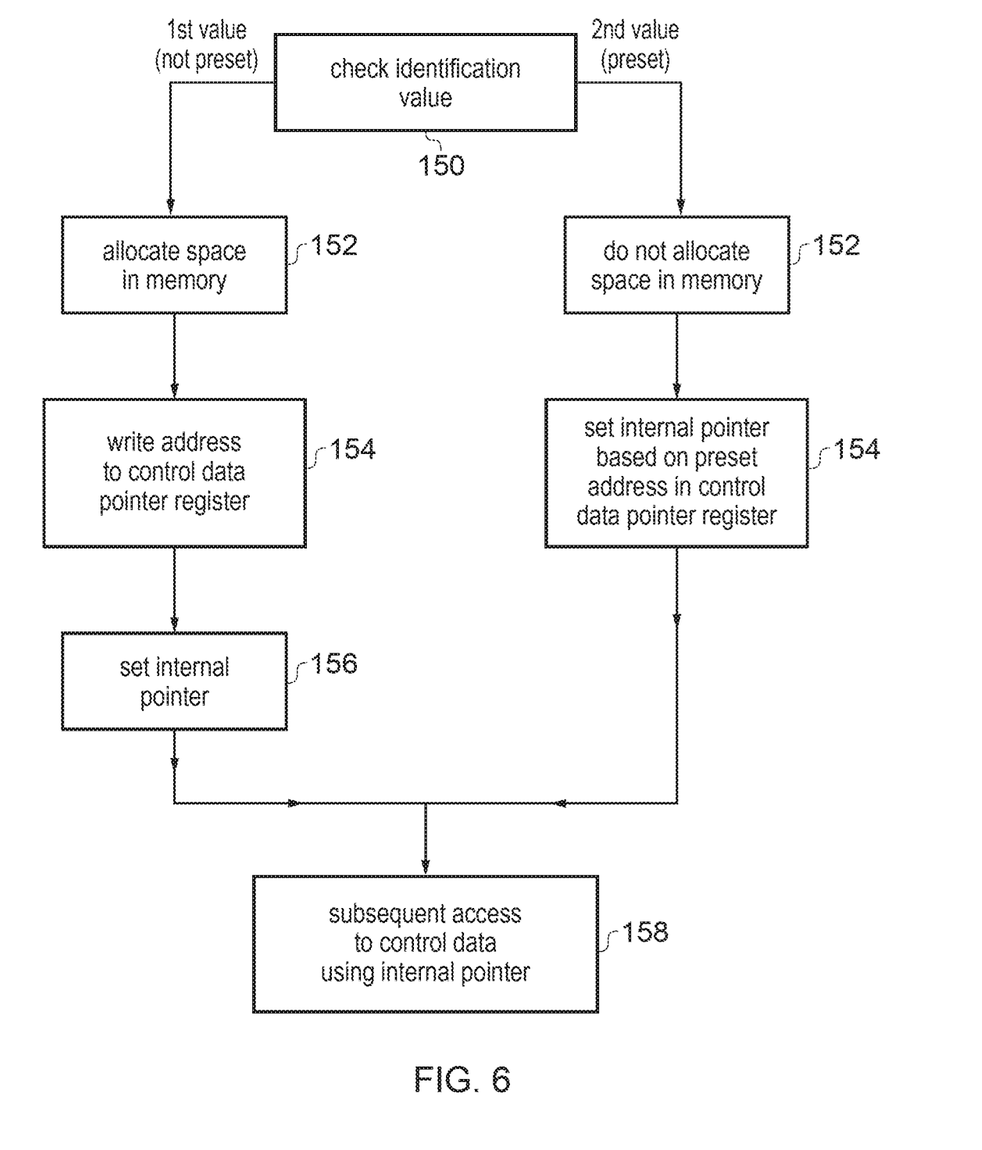
FIG. 6 is a flow diagram illustrating a method of initialising the control data.

FIG. 6 shows a method of initialising the control data. This may be performed by a software driver executing on the processing circuitry 15 of the device 2 or executing on another processing unit such as a CPU 20 shown in FIG. 2. At step 150 the identification value associated with a given type of control data is checked within the capability identification register 12. If the identification value has a first value indicating that the control data is not preset, then at step 152 some space is allocated in the memory 4 for storing the control data and at step 154 an address of the allocated space in memory is written to the control data pointer registers 14 associated with this type of control data. At step 156 an internal pointer may also be set. For example if the address in the control data pointer registers is a relative address or offset, then the internal pointer may be calculated based on the sum of a base address and the specified offset.

On the other hand, if the identification value for this type of control data has a second value at step 150 indicating that the corresponding address is preset, then at step 152 the allocation of space in memory is omitted and instead it is assumed that the base address for this type of control data is fixed so that it does not need to be initialised. At step 154 an internal pointer is calculated based on the preset address in the control data pointer register. For example if the control data pointer address is relative, then the internal pointer may be calculated from a base address and the offset indicated in the control data pointer register 14. When the identification value has the second value, then an existing control data structure is already allocated within the local storage 8 and the location of this is already fixed from the point of view of the software.

Regardless of which approach is taken, then at step 158, any subsequent accesses to the control data are made using the internal pointer so that the software does not need to determine where the control data is stored. For example at step 158 the software driver may begin configuring the control data to refer to the appropriate page tables for defining the address mappings and access permissions for the particular devices and contexts for which memory access is managed by the MMU.

The method shown in FIG. 6 may be repeated for a number of different types of control data which may each have a different identification value.

The identification values to determine which approach to use may be fixed during the manufacture of the device, and if the identification value is set to the second value, the preset address in the control data pointer register 14 may also be fixed during manufacture. Alternatively, the device 2 may have some hardware which initialises the control data pointer register to some preset values during start up of the device or power on so that by the time software becomes active, then from the software's point of view the address is already fixed. This approach may allow different preset addresses to be selected even after manufacture.

In summary, the protocol discussed above allows a common device architecture to support the control data being stored either in memory 4 or local storage 8 as desired, while making this transparent to software and providing a consistent programming interface for the device.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. A method for initializing non-CPU control data for controlling operations performed by a non-CPU device having access to a memory via a bus or interconnect, wherein the memory is also accessible to a CPU via said bus or interconnect and the non-CPU device and the CPU are separated by said bus or interconnect, the non-CPU device comprising at least one of a memory management unit, a direct memory access controller, a USB controller or a peripheral controller, and the method comprising:

determining, on initialization of the non-CPU device, whether an identification value stored in one or more capability identification registers of the non-CPU device has a first value or a second value, wherein said CPU separated from the non-CPU device by said bus or interconnect is permitted to inspect said one or more capability identification registers of the non-CPU device, said identification value being visible to software executing on said CPU separated from the non-CPU device by said bus or interconnect, and said identification value indicating whether the non-CPU control data is to be stored in said memory or in local storage provided within the non-CPU device, wherein the non-CPU device is configured to use the non-CPU control data for controlling said operations, and the memory and the local storage are separated by said bus or interconnect;

when the identification value visible to the software executing on said CPU separated from the non-CPU device by said bus or interconnect has the first value, on initialization of the non-CPU device, allocating space for storing the non-CPU control data in said memory accessible to the non-CPU device via the bus or interconnect, and writing an address of the allocated space in said memory to a control data pointer storage location of the non-CPU device; and when the identification value visible to the software executing on said CPU separated from the non-CPU device by said bus or interconnect has the second value, on initialization of the non-CPU device, omitting allocating the space in said memory accessible to the non-CPU device via the bus or interconnect for storing the non-CPU control data, wherein when the identification value visible to the software executing on said CPU separated from the non-CPU device by said bus or interconnect has the second value, the control data pointer storage location specifies a preset address indicative of a location for storing the non-CPU control data in local storage provided within the non-CPU device, and the non-CPU control data is not stored in said memory accessible to the non-CPU device via the bus or interconnect.

2. The method of claim 1, wherein the preset address comprises a fixed address.

3. The method of claim 1, wherein the non-CPU device comprises presetting circuitry configured to preset the address in the control data pointer storage location when the identification value has the second value.

4. The method of claim 1, comprising setting an internal pointer based on the address of the allocated space in memory when the identification value has the first value, and setting the internal pointer based on the preset address in the control data pointer storage location when the identification value has the second value;
wherein subsequent accesses to the control data are controlled using the internal pointer.

5. The method of claim 1, wherein the local storage comprises one or more registers of the device.

6. The method of claim 1, wherein the local storage comprises a local memory within the device.

7. The method of claim 1, wherein the non-CPU device comprises a memory management unit for managing access to memory by at least one further device.

8. The method of claim 7, wherein the control data comprises a plurality of control data entries corresponding to different contexts or different further non-CPU devices for which access to memory is controlled by the memory management unit.

9. The method of claim 1, wherein the control data comprises a plurality of types of control data.

10. The method of claim 9, wherein the control storage location is configured to store an identification value for at least two of the types of control data; and
the method comprises determining, for each of said at least two types of control data, whether the corresponding identification value has the first value or the second value, allocating the space in memory for a type of control data for which the corresponding identification value has the first value, and omitting allocating the space in memory for a type of control data for which the corresponding identification value has the second value.

11. The method of claim 10, wherein at least two of the types of control data share a corresponding identification value.

12. The method of claim 10, wherein the non-CPU device comprises a memory management unit, and the plurality of types of control data include at least two of:
address translation control data for controlling address translation performed by the memory management unit;
a command queue for tracking commands received by the memory management unit; and
an event queue for tracking events detected by the memory management unit.

13. The method of claim 1, wherein the non-CPU device comprises a cache for caching at least some of the control data from the allocated space in memory when the identification value has the first value.

14. The method of claim 1, wherein:
the non-CPU device comprises a system memory management unit (SMMU) configured to manage access to memory for at least one peripheral device separated from the CPU by the bus or interconnect; and
the non-CPU control data comprises SMMU control data for controlling operations of the SMMU.

15. The apparatus of claim 14, wherein SMMU control data comprises at least one of:
a stream table storing information for controlling address translation performed by the SMMU for each of a plurality of streams of transactions received by the SMMU;
a command queue for tracking address translation commands received by the SMMU; and
an event queue for tracking events detected by the SMMU.

16. An apparatus comprising:
a non-CPU device comprising at least one of a memory management unit, a direct memory access controller, a USB controller or a peripheral controller;
local storage circuitry configured to store data within said non-CPU device;
one or more capability identification registers in the local storage circuitry configured to store an identification value having one of a first value and a second value, wherein a CPU separated from the non-CPU device by a bus or interconnect is permitted to inspect said one or more capability identification registers of the non-CPU device; and
control circuitry configured to determine, on initialization of the non-CPU device, whether the identification value has the first value or the second value, said identification value being visible to the software executing on said CPU separated from the non-CPU device by said bus or interconnect, and said identification value indicating whether control data is to be stored in a memory accessible to the non-CPU device via said bus or interconnect or in the local storage circuitry provided within the non-CPU device, wherein the non-CPU device is configured to use the control data for controlling said operations, the memory and the local storage circuitry are separated by said bus or interconnect, and the memory is also accessible to the CPU via said bus or interconnect;
wherein when the identification value visible to the software executing on said CPU separated from the non-CPU device by said bus or interconnect has the first value, the control circuitry is configured, on initialization of the non-CPU device, to allocate space in said memory accessible to the non-CPU device via the bus or interconnect for storing the control data and to write an address of the allocated space in said memory to a control data pointer storage location of the non-CPU device; and
when the identification value visible to the software executing on said CPU separated from the non-CPU device by said bus or interconnect has the second value, the control circuitry is configured, on initialization of the non-CPU device, to omit allocating the space in said memory accessible to the non-CPU device via the bus or interconnect for storing the control data, and the control data pointer storage location specifies a preset address indicative of a location for storing the control data in the local storage circuitry within said non-CPU device, and the control data is not stored in said memory accessible to the non-CPU device via the bus or interconnect.

17. An apparatus comprising:

a non-CPU device comprising at least one of a memory management unit, a direct memory access controller, a USB controller or a peripheral controller;

means for locally storing data within said non-CPU device;

means for storing an identification value having one of a first value and a second value, wherein a CPU separated from the non-CPU device by a bus or interconnect is permitted to inspect said means for storing an identification value; and control means for determining, on initialization of the non-CPU device, whether the identification value has the first value or the second value, said identification value being visible to the software executing on said CPU separated from the non-CPU device by said bus or interconnect, and said identification value indicating whether control data is to be stored in a memory accessible to the non-CPU device via said bus or interconnect or in the means for locally storing data provided within the non-CPU device, wherein the non-CPU device is configured to use the control data for controlling said operations, the memory and the means for locally storing data are separated by said bus or interconnect, and the memory is also accessible to the CPU via said bus or interconnect;

wherein when the identification value visible to the software executing on said CPU separated from the non-CPU device by said bus or interconnect has the first value, the control means is configured, on initialization of the non-CPU device, to allocate space in said memory accessible to the non-CPU device via the bus or interconnect, for storing the control data and write an address of the allocated space in said memory to a control data pointer storage location of the non-CPU device; and when the identification value visible to the software executing on said CPU separated from the non-CPU device by said bus or interconnect has the second value, the control means is configured, on initialization of the non-CPU device, to omit allocating the space in said memory accessible to the non-CPU device via the bus or interconnect for storing the control data, and the control data pointer storage location specifies a preset address indicative of a location for locally storing the control data in said means for locally storing data within said non-CPU device, and the control data is not stored in said memory accessible to the non-CPU device via the bus or interconnect.

* * * * *